US007108014B2

(12) United States Patent
Sekiguchi

(10) Patent No.: US 7,108,014 B2
(45) Date of Patent: Sep. 19, 2006

(54) LIQUID DILUTING DEVICE

(75) Inventor: Shinichi Sekiguchi, Kanagawa (JP)

(73) Assignee: Mikuni Corporation, Tokyo ( * ) Notice: Subject to any disclaimer, the term of this patent is extended or adjusted under 35 U.S.C. 154(b) by 179 days.

(21) Appl. No.: 10/511,764

(22) PCT Filed: Mar. 17, 2003

(86) PCT No.: PCT/JP03/03168

§ 371 (c)(1),
(2), (4) Date: Oct. 19, 2004

(87) PCT Pub. No.: WO03/090915

PCT Pub. Date: Nov. 6, 2003

(65) Prior Publication Data

US 2005/0217744 A1 Oct. 6, 2005

(30) Foreign Application Priority Data

Apr. 26, 2002 (JP) ............................. 2002-127108

(51) Int. Cl.
*F16K 11/00* (2006.01)

(52) U.S. Cl. ...................... 137/890; 137/893; 137/897; 239/407

(58) Field of Classification Search ................ 137/889, 137/890, 893, 897, 580; 239/407
See application file for complete search history.

(56) References Cited

U.S. PATENT DOCUMENTS 2,751,974 A * 6/1956 Stadler ...................... 48/180.1
RE25,037 E * 9/1961 Brazier .................. 137/599.12
3,762,439 A * 10/1973 Heath ......................... 137/549
4,368,757 A * 1/1983 Finger ................... 137/565.17
5,230,368 A * 7/1993 Berfield ....................... 137/889
6,789,571 B1 * 9/2004 Sekiguchi ............. 137/599.03
2002/0100514 A1 8/2002 Sekiguchi
2003/0106598 A1 6/2003 Sekiguchi

FOREIGN PATENT DOCUMENTS

JP 3349166 8/1993
JP 3149166 1/2001
JP 2003-154245 5/2003

* cited by examiner

*Primary Examiner*—A. Michael Chambers
(74) *Attorney, Agent, or Firm*—Harness, Dickey & Pierce, P.L.C.

(57) ABSTRACT

A diluent passage 12 to introduce special liquid and a rinse liquid supply passage 13 which is separate from the diluent passage 12 are formed in the main body 10, and a plurality of jets are disposed at a cylindrical dial 18. A water convey passage is formed to connect two positions at the rinse liquid supply passage 13 where pressure difference occurs therebetween to the other jets 19*b*, 19*c* except the jet 19*a* through which the special liquid is introduced. When water flows in the rinse liquid supply passage 13, the water is introduced to the water convey passage due to the pressure difference of the rinse liquid supply passage 13. The water rinses the other jets 19*b*, 19*c* except for the jet 19*a* through which the special liquid is introduced. Therefore, adjusting changes or choking of the jets 19*b*, 19*c* which have not been used for a considerable time can be prevented.

4 Claims, 10 Drawing Sheets

LIQUID DILUTING DEVICE

TECHNICAL FIELD

The present invention relates to a liquid dilution device to dilute a special liquid. More particularly, it relates to a liquid dilution device in which a jet for adjusting a dilution factor can be cleaned.

BACKGROUND ART

Conventionally, liquid dilution devices are widely used to mix a special liquid such as a chemical liquid or detergent with tap water, for sterilization or disinfection when rinsing tableware or fresh vegetables. As disclosed in Japanese Patent No. 3149166 and so on, for example, the conventional liquid dilution device includes inside a body, a diluent passage for allowing passage of water (tap water), a negative pressure generate section formed in order to generate negative pressure somewhere along the diluent passage, and a liquid introduce passage connected at one end to the negative generate section and connected at the other end to a special liquid tank. By allowing a liquid, such as water or the like, into the diluent passage, negative pressure is generated at the negative pressure generate section. By this negative pressure, the special liquid is introduced from a special liquid tank into the diluent passage, and the special liquid is mixed with the water flowing in the diluent passage and thus is diluted.

Since it is desired for such a liquid dilution device to change the dilution factor depending on the special liquid, various methods for changing the dilution factor have been devised. For example, one design that was devised was to fix a jet in a hose connecting the special liquid tank to the liquid dilution device, and interchange the jets depending on the special liquid. However there is a problem that the interchanging of the jets by a user is inferior in efficiency and interchangeability.

Therefore, another design was devised to provide a dilution factor switching means in the liquid dilution device itself. A liquid dilution device of the related art provided with a dilution factor switching means is shown in FIG. 8 and FIG. 9, and the dilution factor switching means is shown in FIG. 10. One diluent passage 61 is formed inside the body 60, for introducing a diluent such as water. The diluent passage 61 includes a venturi section 62 formed at some midstream as a negative pressure generate section, and a diffusion section 63 formed at a downstream side of this venturi section 62 as a negative pressure generate section having a diameter larger than that of the venturi section 62. In the body 60, a connect passage 64 which connects the diffusion section 63 to the outer side of the body 60 is formed.

A disk 66, as the dilution factor switching means, which is sandwiched by the body 60 and a holding member 65, is provided on the outer side of the body 60 at the side of an opening section of the connect passage 64. The disk 66 is rotatably attached to the body 60 and the holding member 65 through a bearing 68, centering around a shaft (bolt) 67 which is a fixing means for fixing the holding member 65 to the body 60. As shown in FIG. 10, a plurality of jets 69, respectively varying in diameter, are formed at the disk 66 on the same radius from a rotation center position.

In addition to the holding member 65, a liquid introduce device 70 is provided on the opposite side of the body 60 to sandwich the disk 66. Then, the liquid introduce device 70 is fixed to the body 60. The liquid introduce device 70 includes a first body 71 and a second body 72. A liquid supply passage 73 connecting to a special liquid tank, not shown in the figure, is formed inside the first body 71 and the second body 72. The liquid supply passage 73 is connected to the diluent passage 61 through the jet 69 formed in the disk 66 and the connect passage 64 of the body 60.

A ring-shaped seal member 74 is attached at a position of the body 60 facing the disk 66 and surrounding the connect passage 64. The ring-shaped seal member 74 is for preventing leakage of water from a joint surface of the body 60 and disk 66 passing through the diluent passage 61 and the connect passage 64. A ring-shaped seal member 75 is attached at a position of the first body 71 of the liquid introduce device 70 facing the disk 66 and surrounding the liquid supply passage 73. The ring-shaped seal member 75 is for preventing leakage of a special liquid from a joint surface of the first body 71 of the liquid introduce device 70 and the disk 66 passing through the liquid supply passage 73. An elastic member 76 is provided at a position of the body 60 facing the disk 66 and being far from the seal member 74. An elastic member 77 is provided at a position of the holding member 65 facing the disk 66 and with some distance from the seal member 75. These elastic members 76 and 77 prevent the disk 66 from leaning towards either the body 60 or the holding member 65.

By lining up one of the plurality of jets 69 formed in the disk 66 to the connect passage 64 of the body 60, the connect passage 64 of the body 60 and the liquid supply passage 73 of the liquid introduce device 70 are connected through the jet 69. In this manner, when the connect passage 64 and the liquid supply passage 73 are connected through the jet 69, the special liquid is introduced from the liquid supply passage 73 into the diluent passage 61 by negative pressure generated in a diffusion section 63 of the diluent passage 61. Here, it is possible to vary the flow amount of the special liquid introduced into the diluent passage 61 so as to change the dilution factor, by rotating the disk 66 to line up one of the plurality of jets 69 with the connect passage 64 and the liquid supply passage 73.

With the dilution factor switching means 66 having the plurality of jets 69 for adjusting flow amount, when a certain time passes after the jet 69 is once used, there arises a problem that the desired dilution factor cannot be obtained because the special liquid may dry out and stick to the jet 69, or the jet 69 may be choked.

The present invention was devised in the light of the abovementioned problem. The object of the present invention is to provide a liquid dilution device which can prevent a jet for adjusting flow amount of the special liquid from adjusting changes or choking.

DISCLOSURE OF THE INVENTION

A liquid dilution device of the present invention comprises a main body, a diluent passage formed in the main body, a negative pressure generate section formed in some midstream of the diluent passage, a first connect passage formed in the main body and connected to the negative pressure generate section, a special liquid supply passage to supply special liquid to the diluent passage through the first connect passage, a rinse liquid supply passage formed in the main body being different from the diluent passage, a negative pressure generate section formed in some midstream of the rinse liquid supply passage, a cylindrical dial disposed to be free to pivot outside the main body, a plurality of jets disposed on a specific circumference of the dial to connect the first connect passage to the special liquid supply passage, an outer body disposed outside the dial to cover the jet, an outer connect passage formed at the facing position of the dial and the outer body to be connected with the other jet than the jet which connects the first connect passage to the special liquid supply passage, a rinse liquid introduce passage connected at one side to a position which negative pressure is smaller than that of the negative pressure generate section of the rinse liquid supply passage and connected at the other side to the outer connect passage, an inner connect passage formed at the facing position of the dial and the main body to be connected with the other jet, and a second connect passage connected at one side to the inner connect passage and at the other side to the negative pressure generate section of the rinse liquid supply passage, wherein negative pressure is generated at the negative pressure generate section of the rinse liquid supply passage by flowing liquid in the rinse liquid supply passage, and the liquid is conveyed by the negative pressure from the rinse liquid supply passage to the negative pressure generate section of the rinse liquid supply passage in order via the rinse liquid introduce passage, the outer connect passage, the other jet, and the second connect passage, so that the liquid flowing in the rinse liquid supply passage flows through the other jet.

The liquid dilution device of the present invention, further comprises a slot formed at the inner wall of the dial respectively, extending from the position near each jet to a position with some distance, and a cylindrical second seal member attached at a position surrounding the second connect passage of the main body, wherein the second seal member contacts invariably to the inner wall of the dial around a position at which one of the other jets is held, and the second connect passage connects to the inner connect passage via the slot corresponding to the jet at the position surrounded by the second seal member, only when each jet is at a specific position.

The liquid dilution device of the present invention further comprises a cylindrical first seal member attached at a position surrounding the first connect passage of the main body, wherein the first seal member contacts invariably to the inner wall of the dial around a position at which the jet which connects the first connect passage with the special liquid supply passage is held, and the connection between the first connect passage and the inner connect passage is intercepted even through the slot.

A liquid dilution device of the present invention comprises a main body, a diluent passage formed in the main body, a negative pressure generate section formed in some midstream of the diluent passage, a first connect passage formed in the main body and connected to the negative pressure generate section, a special liquid supply passage to supply special liquid to the diluent passage through the first connect passage, a cylindrical dial disposed to be free to pivot outside the main body, a plurality of jets disposed on a specific circumference of the dial to connect the first connect passage to the special liquid supply passage, an outer body disposed outside the dial to cover the jet, an outer connect passage formed at the facing position of the dial and the outer body, to be connected with the other jet than the jet which connects the first connect passage to the special liquid supply passage, an inner connect passage formed at the facing position of the dial and the main body, to be connected with the other jet, a first introduce passage connecting a relatively small negative pressure position in the diluent passage to the outer connect passage, and a second introduce passage connecting a relatively large negative pressure position in the diluent passage to the inner connect passage, wherein pressure difference is generated between the relatively large negative pressure position and the relatively small negative pressure position by flowing liquid in the diluent passage, and the liquid is conveyed by the pressure difference from the small negative pressure position of the diluent passage to the large negative pressure position of the diluent passage via the first introduce passage, the outer connect passage, the other jet, the inner connect passage, and the second introduce passage, so that the liquid flowing in the diluent passage flows through the other jet.

BRIEF DISCRIPTION OF THE DRAWINGS

BEST MODE FOR CARRYING OUT THE INVENTION

The First Embodiment

The present invention is explained in the following with reference to the drawings.

Figure 1:
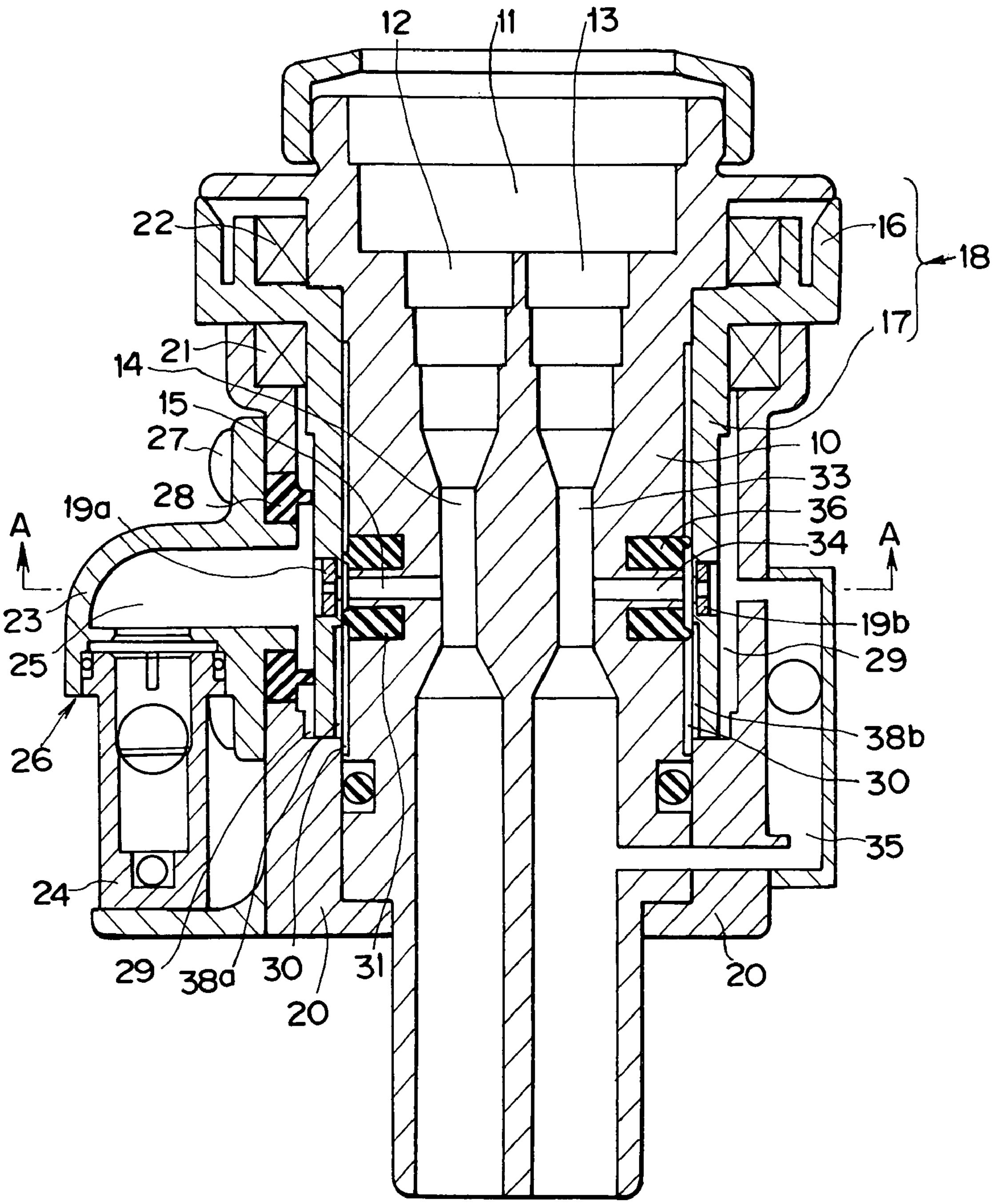
FIG. 1 is a sectional view showing an embodiment of the liquid dilution device of the present invention.
Figure 2:
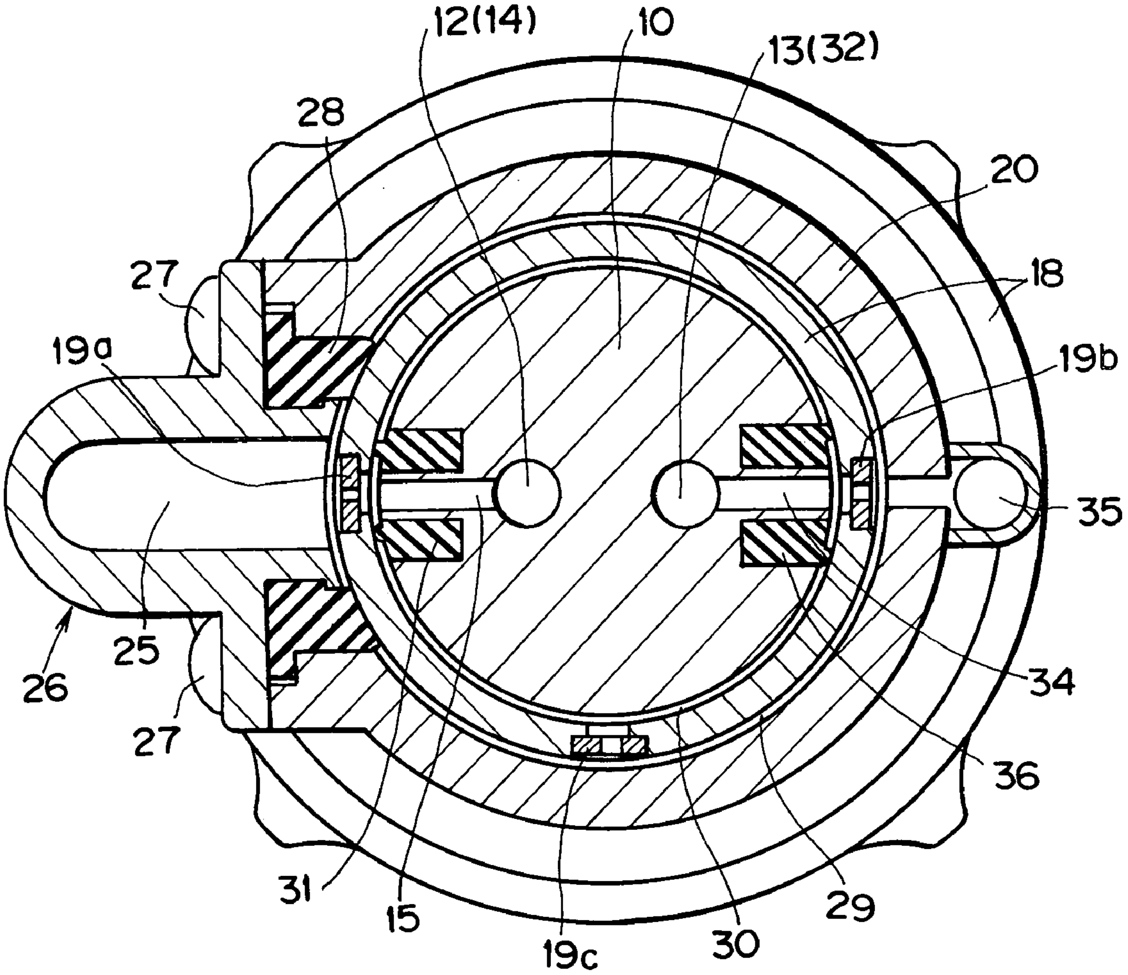
FIG. 2 is a sectional view at A—A in FIG. 1.

FIG. 1 is a sectional view showing an embodiment of the liquid dilution device of the present invention. FIG. 2 is a sectional view at A—A in FIG. 1. A diluent main passage 11 is formed inside a main body 10 to introduce a liquid, such as water, i.e. a diluent. The diluent main passage 11 branches into a diluent passage 12 and a rinse liquid supply passage 13 at some midstream. A venturi section 14 as a negative pressure generate section is formed at some midstream of the diluent passage 12. A first connect passage 15 is formed in the main body 10 to connect the venturi section 14 to the outside of the main body 10. In FIG. 1 and FIG. 2, one diluent passage 12 and one rinse liquid supply passage 13 are formed in the main body 10. However, it is not limited to only one diluent passage 12 and one rinse liquid supply passage 13.

A cylindrical dial (a switching means) 18 having a large diameter section 16 and a small diameter section 17 is rotatably provided to the outer side of the main body 10. The central axis for rotation of the dial 18 is set so as to be parallel to the direction of the flow of water or the like in the diluent main passage 11, the diluent passage 12 and the rinse liquid supply passage 13. At the circumference position of the small diameter section 17 of the dial 18 facing the first connect passage 15, a plurality of jets 19*a*, 19*b*, 19*c* are disposed to connect the inside and the outside of the small diameter section 17. The plurality of jets 19*a*, 19*b*, 19*c* are set to be respectively varying in diameter. Three jets are disposed in FIG. 2, but it is not limited to three if the number of jets is two or more.

A cylindrical outer body 20 is fixed to the main body 10 by a fixing means (not shown in figures). The cylindrical outer body 20 covers the outside of the small diameter section 17 of the dial 18. An oil seal 21 is provided between an upper inner wall of the cylindrical outer body 20 and an upper outer wall of the small diameter section 17 of the dial 18. Further, an oil seal 22 is provided between an outer wall of the main body 10 and an inner wall of the large diameter section 16 of the dial 18. In the state that the main body 10 and the outer body 20 are fixed together, the large diameter section 16 of the dial 18 is exposed to the outer side than the main body 10 and the outer body 20. Then, the dial 18 is free to pivot to the main body 10 and the outer body 20 by turning the large diameter section 16 of the dial 18.

A liquid introduce device 26 which has a first body 23 and a second body 24 outside and has a special liquid supply passage 25 inside is fixed outside the outer body 20 by a fix means 27. Specifically, the first body 23 of the liquid introduce device 26 is fixed to the outer body 20 by the fix means 27. The special liquid supply passage 25 is connected to a special liquid tank (not shown in figures), and the special liquid is introduced to the special liquid supply passage 25 from the special liquid tank. In the state that the outer body 20 is fixed to the liquid introduce device 26, the special liquid supply passage 25 of the liquid introduce device 26 is connected to the first connect passage 15 of the main body 10 through a jet 19*a* disposed at the dial 18. When the first body 23 of the liquid introduce device 26 is fixed to the outer body 20, a seal member 28 is disposed at the connecting position of the first body 23 and the dial 18. The seal member 28 is to prevent leakage of the special liquid to the outside when passing from the special liquid supply passage 25 of the liquid introduce device 26 to the jet 19*a* (the first connect passage 15 of the main body 10). The seal member 28 is set to contact the outer surface of the dial 18 invariably wherever the dial rotates and positions.

A cylindrical outer connect passage 29 is formed between the inner wall of the outer body 20 and the outer wall of the cylindrical dial 18 at the facing position thereof. The outer connect passage 29 is connected to all the jets 19*b*, 19*c* (called "the other jets" hereinafter) except the jet 19*a* which locates at a position to connect the special liquid supply passage 25 and the first connect passage 15. The seal member 28 prevents connection between the outer connect passage 29 and the special liquid supply passage 25 (the jet 19*a*) of the liquid introduce device 26. It is preferable to dispose the cylindrical outer connect passage 29 at the outer wall of the dial 18. However, it is also possible to dispose it at the inner wall of the outer body 20.

A cylindrical inner connect passage 30 is formed at the facing position of the inner wall of the dial 18 and the outer wall of the main body 10. It is preferable to dispose the inner connect passage 30 at the outer wall of the main body 10. However, it is also possible to dispose it at the inner wall of the dial 18. A first seal member 31 is disposed at the outer wall of the main body 10 to prevent connection of the inner connect passage 30 with the jet 19*a* and the first connect passage 15. A ring-shaped top end project section 32 is formed at the first seal member 31. The ring-shaped top end project section 32 of the first seal member 31 is set to contact the inner wall of the dial 18 invariably. In this manner, connection of the jet 19*a* locating at the position to connect the special liquid supply passage 25 and the first connect passage 15 with the outer connect passage 29 is prevented by the seal member 28, and connection of that with the inner connect passage 30 is prevented by the first seal member 31.

A venturi section 33 as the negative pressure generate section is formed at some midstream of the rinse liquid supply passage 13 which is formed in the main body 10. A second connect passage 34 to connect the venturi section 33 and the inner connect passage 30 is formed in the main body 10. As shown in FIG. 1 and FIG. 2, the jet 19*b* (one of the jets except the jet 19*a*) is set to position on the extension line of the second connect passage 34. In this manner, the second connect passage 34 directly connects to the jet 19*b*.

A rinse liquid introduce passage 35 connects the outer connect passage 29 with a position where the negative pressure is not larger than that of the venturi section 33 of the rinse liquid supply passage 13 (for example, a downstream position than the venturi section 33). Although the rinse liquid introduce passage 35 is formed in both the main body 10 and the outer body 20, it is not limited to this structure.

A cylindrical second seal member 36 is attached to the outer wall of the main body 10 to prevent the connection of the inner connect passage 30 with the jet 19*b* or the second connect passage 34. A ring-shaped top end project section 37 is formed at the second seal member 36. The ring-shaped top end project section 37 is set to contact invariably to the inner wall of the dial 18 around the position to hold the jet 19*b*.

Figure 3:
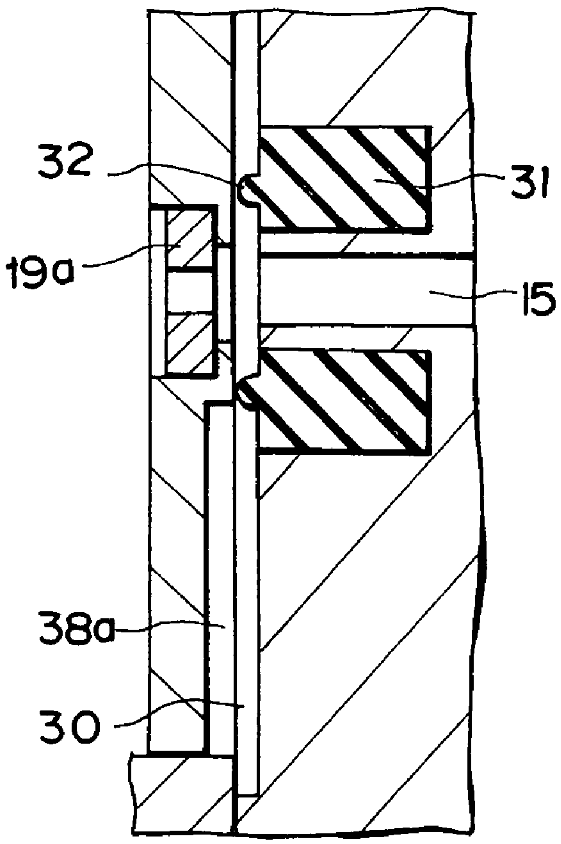
FIG. 3 is a sectional view of a main part of a position where a jet introduces a special liquid.
Figure 4:
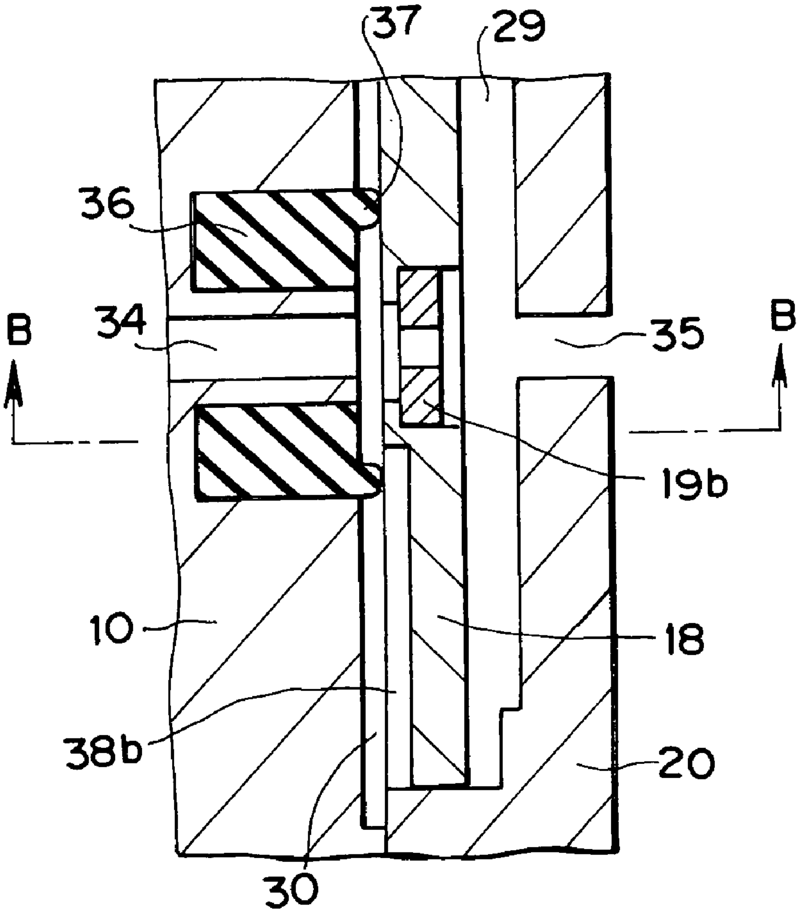
FIG. 4 is a sectional view of a main part of a position where a jet is rinsed.
Figure 5:
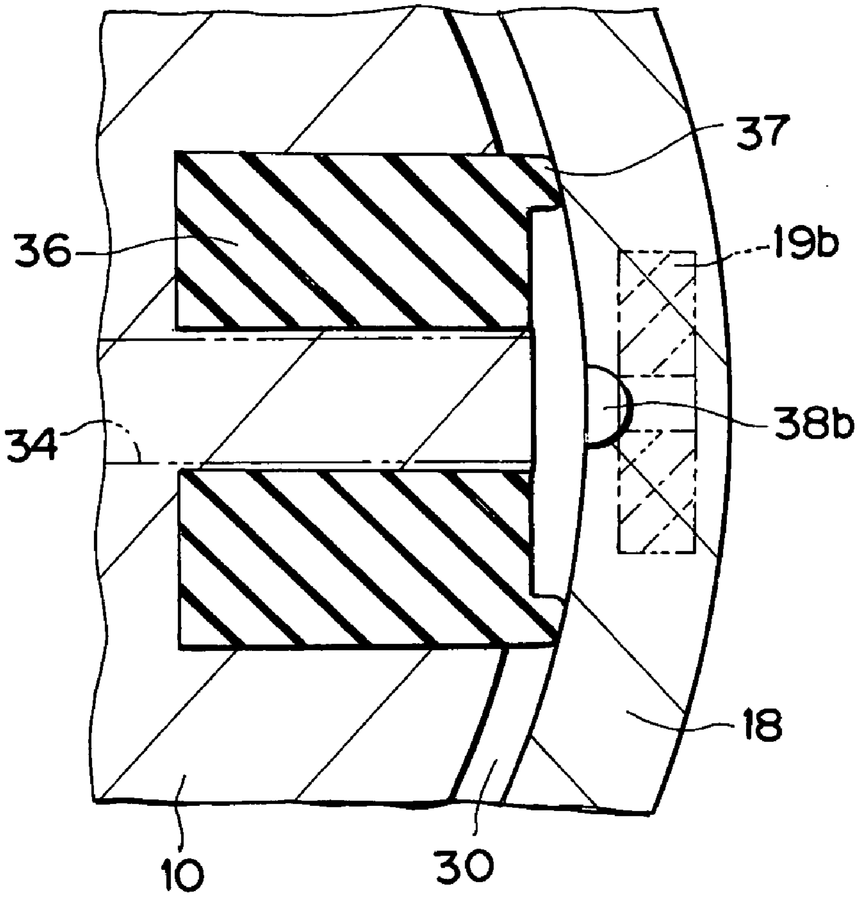
FIG. 5 is a sectional view at B—B in FIG. 4.

As shown in FIG. 1, FIG. 3, FIG. 4 and FIG. 5, in accordance with the attaching positions of the jets 19*a*, 19*b*, 19*c* of the dial 18, a slot 38 is formed at the inner wall of the dial 18 extending from a position near the jet 19*a*, 19*b*, 19*c* to a position far away (for example, to the bottom end). Regarding the slot 38, the slot corresponding to the jet 19*a* is 38*a*, and the slot corresponding to the jet 19*b* is 38*b*. (The slot corresponding to the jet 19*c* is not shown in figures.) As shown in FIG. 4, when the jet 19*b* is at the position to be connected with the second connect passage 34, the inner connect passage 30 is not to be connected with the jet 19*b* and the second connect passage 34 due to the contact of the second seal member 36 and the inner wall of the dial 18. However, since the upper end of the slot 38*b* reaches inside the ring-shaped top end project section 37 of the second seal member 36, the inner connect passage 30 connects to the second connect passage 34. As shown in FIG. 2, the jet 19*c* connects to the inner connect passage 30. Therefore, the jet 19*c* connects to the second connect passage 34 through the slot 38*b*.

As shown in FIG. 1 and FIG. 3, when the jet 19*a* is at the position to be connected to the first connect passage 15, the ring-shaped top end project section 32 of the first seal member 31 contacts to the inner wall of the dial 18, and there is no connection of the inner connect passage 30 with the jet 19*a* and the first connect passage 15. The diameter of the ring-shaped top end project section 32 is formed to be smaller than that of the ring-shaped top end project section 37 of the second seal member 36. The slot 38*b* for the jet 19*b* reaches inside the ring-shaped top end project section 37 of the second seal member 36. The diameter of the ring-shaped top end project section 32 of the first seal member 31 is formed to be smaller than that of the ring-shaped top end project section 37 of the second seal member 36, so that the slot 38*a* for the jet 19*a* does not reach inside the ring-shaped top end project section 32 of the first seal member 31. Therefore, even when one of the other jets 19*b* is at the position to be connected to the first connect passage 15, the slot 38*b* corresponding to the jet 19*b* at the position does not connect with the jet 19*b* and the first connect passage 15.

With the present invention having the abovementioned structure, the dial 18 is rotated to select a jet (for example, 19*a*) which has a diameter that matches a desired dilution factor out of the jets 19*a*, 19*b*, 19*c* respectively varying in diameter. The selected jet 19*a* is lined up with the first connect passage 15 of the main body 10 and the special liquid supply passage 25 of the liquid introduce device 26. When tap water, for example, is introduced into the diluent main passage 11, the tap water is discharged outside through the diluent passage 12. In this case, negative pressure is generated at the venturi section 14 of the diluent passage 12. The negative pressure reaches the special liquid supply passage 25 of the liquid introduce device 26, and the special liquid is introduced to the diluent passage 12 through the jet 19*a* and the first connect passage 15. The special liquid is mixed with the tap water in the diluent passage 12, and the desired dilution factor of the special liquid can be obtained. Here, it is possible to change the dilution factor of the special liquid by selecting a desired jet out of the other jets 19*a*, 19*b*, 19*c* respectively varying in diameter.

The special liquid such as a chemical liquid or detergent flows through the jet 19*a* which connects the special liquid supply passage 25 of the liquid introduce device 26 to the first connect passage 15 of the main body 10. Therefore, the jet 19*a* which is used continuously has little possibility of the special liquid sticking due to drying. However, the special liquid may dry out and stick to the other jets 19*b*, 19*c* which were used before and is not used this time. Therefore, there is a possibility that the jets 19*b*, 19*c* are choked and the dilution factor deviates at the time of use thereafter.

With the present invention, at the time of using the liquid dilution device, water flows through the jets 19*b*, 19*c* to rinse simultaneously the jets 19*b*, 19*c* except the jet 19*a* through which the special liquid flows. When tap water, for example, is introduced into the diluent main passage 11, the tap water flows into the rinse liquid supply passage 13 as well as the diluent passage 12. When the tap water flows into the rinse liquid supply passage 13, the tap water flows into the rinse liquid introduce passage 35 which connects to the down-stream of the venturi section 33 of the rinse liquid supply passage 13. The rinse liquid introduce passage 35 connects to the outer connect passage 29, and the outer connect passage 29 connects to the jets 19*b*, 19*c* except the jet 19*a*. The jet 19*b* connects to the venturi section 33 through the second connect passage 34. The jet 19*c* connects to the venturi section 33 through the inner connect passage 30, the slot 38*b* corresponding to the jet 19*b*, and the second connect passage 34. Namely, the venturi section 33 of the rinse liquid supply passage 13 connects to the position, to which the rinse liquid introduce passage 35 is connected in the rinse liquid supply passage 13, through the jets 19*b*, 19*c*.

When the tap water flows through the rinse liquid supply passage 13, in the rinse liquid supply passage 13, pressure difference is generated between the venturi section 33 and the position to which the rinse liquid introduce passage 35 is connected. Here, the negative pressure at the venturi section 33 is larger. The negative pressure at the venturi section 33 is led to the connecting position to which the rinse liquid introduce passage 35 is connected in the rinse liquid supply passage 13, through the second connect passage 34, all the other jets 19*b*, 19*c*, the outer connect passage 29, and the rinse liquid introduce passage 35. By the negative pressure which is led to the position to which the rinse liquid introduce passage 35 is connected in the rinse liquid supply passage 13, water is introduced from the position to which the rinse liquid introduce passage 35 is connected in the rinse liquid supply passage 13, and the water is conveyed to the venturi section 33 of the rinse liquid supply passage 13 through the rinse liquid introduce passage 35, the outer connect passage 29, all the other jets 19*b*, 19*c*, and the second connect passage 34.

In this manner, at the state that the liquid dilution device is used, water flows through all the other jets 19*b*, 19*c* through which the special liquid does not flow. The water passing through the jets 19*b*, 19*c* is accelerated to high velocity at the position of the jets 19*b*, 19*c* which sectional area is small. The special liquid which is stuck to the jets 19*b*, 19*c* can be removed with the water of high velocity. As a result, at the time of using the liquid dilution device, all the other jets 19*b*, 19*c* through which the special liquid does not flow are continuously rinsed, and the choking at the all the other jets 19*b*, 19*c* except the jet 19*a* through which the special liquids flow can be prevented.

With the first embodiment, the second seal member 36 is attached to the outer wall of the main body 10, and the second seal member 36 is arranged to contact invariably to the inner wall of the dial 18 around the position to hold the jet 19*b*. Then, only when the jet 19*b* is at the specific position (the position which is on the extension line of the second connect passage 34), the second connect passage 34 connects to the inner connect passage 30 (and the other jet 19*c*) through the slot 38*b* corresponding to the jet 19*b*. If the second connect passage 34, the inner connect passage 30 and all the other jets 19*b*, 19*c* are connected without disposing the second seal member 36, there is a possibility that the special liquid flows into the second connect passage 34 through the inner connect passage 30 when the dial 18 stops at some rotating midpoint. The second seal member 36 is disposed to prevent such a phenomenon.

Here, in using the liquid dilution device of the first embodiment, since water flows through both the diluent passage 12 and the rinse liquid supply passage 13, the diameters of the jets 19*a*, 19*b*, 19*c* are determined in consideration with the total water amount and the dilution factor of the special liquid.

The Second Embodiment

Another embodiment of the present invention is explained in the following with reference to the drawings.

Figure 6:
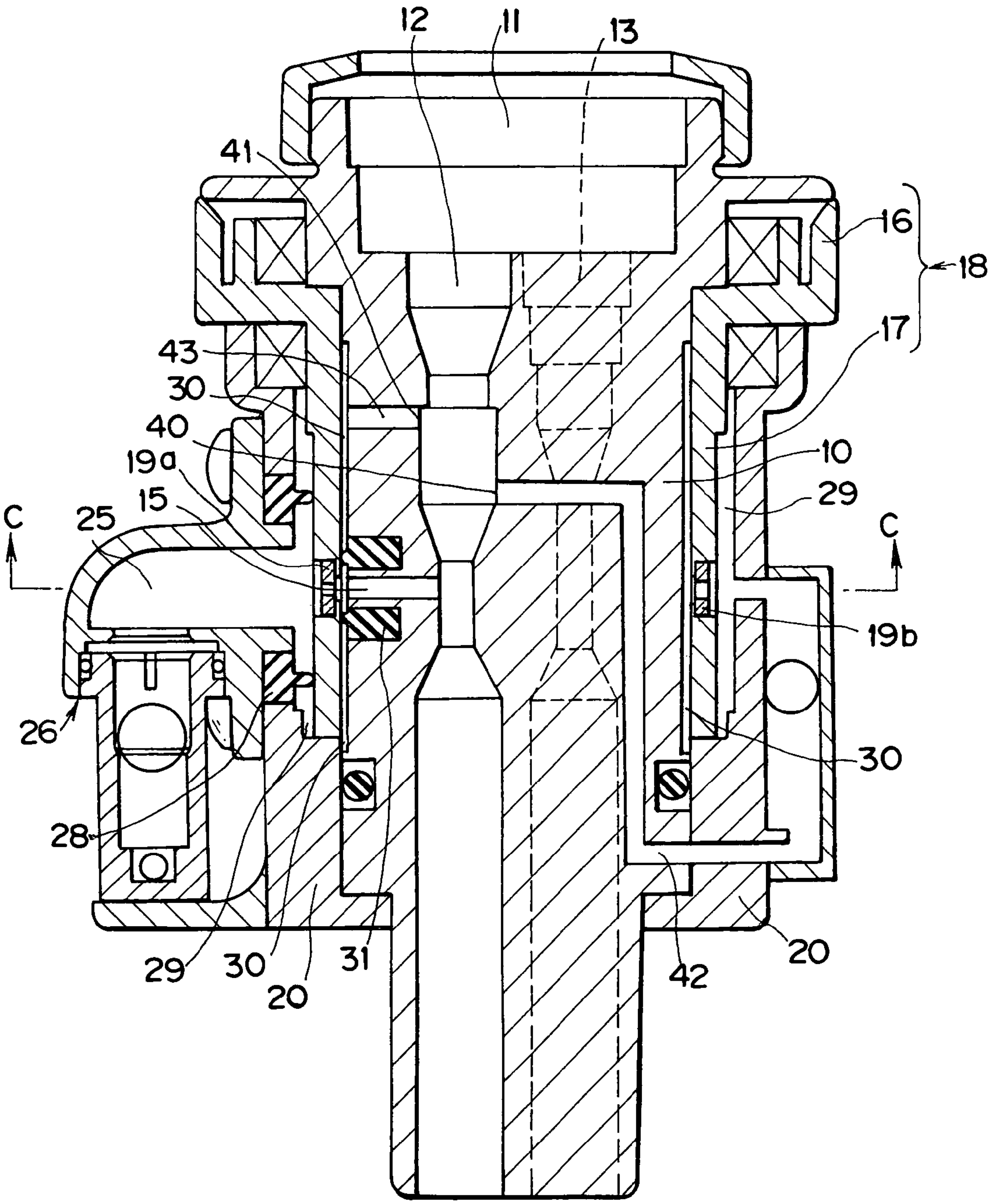
FIG. 6 is a sectional view showing another embodiment of the liquid dilution device of the present invention.
Figure 7:
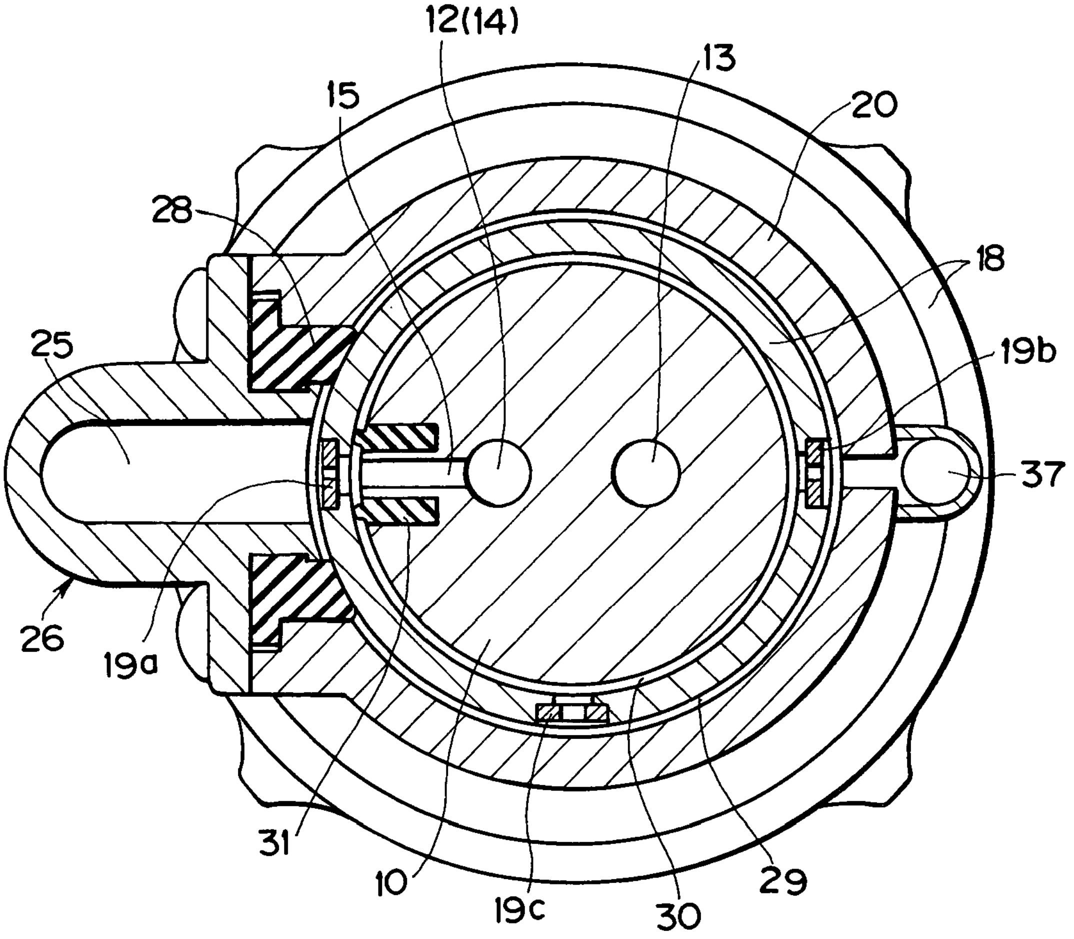
FIG. 7 is a sectional view at C—C in FIG. 6.
Figure 8:
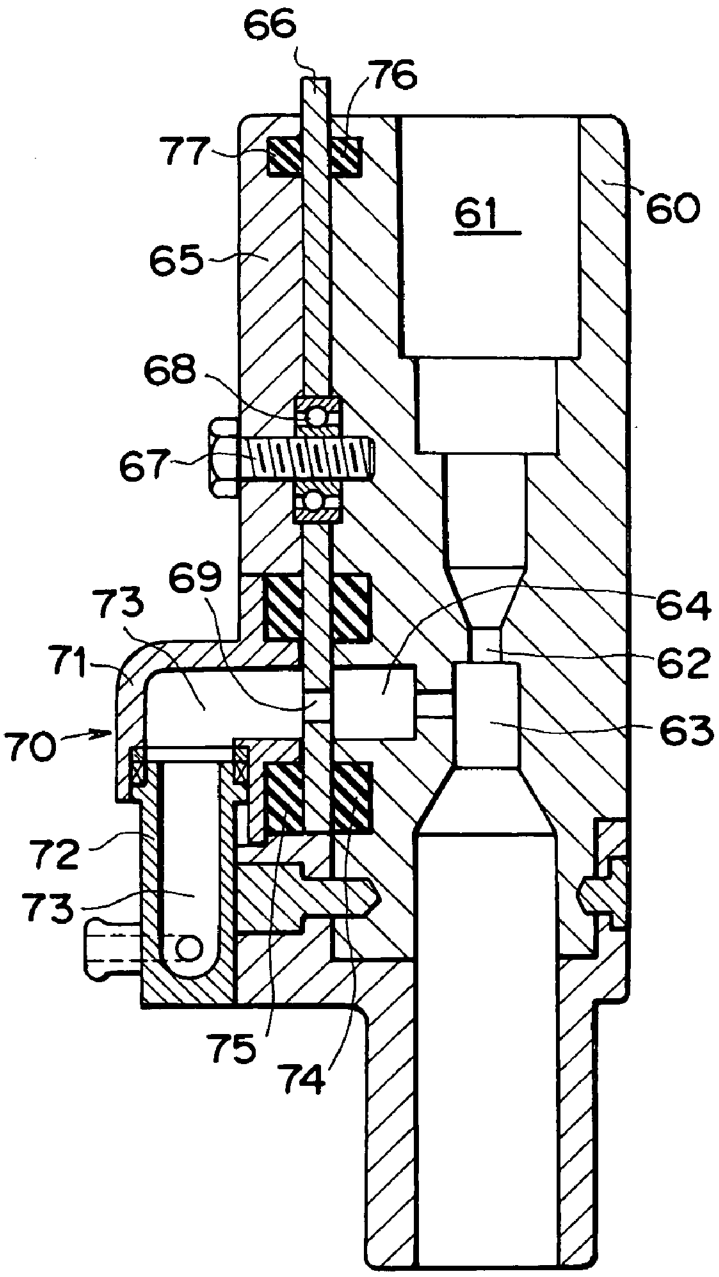
FIG. 8 is a sectional view of a liquid dilution device of the related art.
Figure 9:
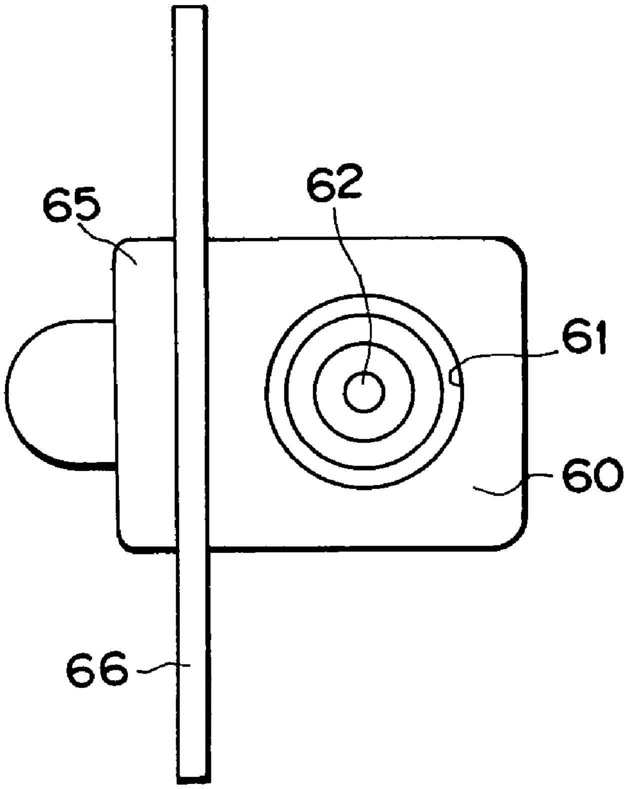
FIG. 9 is a plain view of the liquid dilution device shown in FIG. 8.
Figure 10:
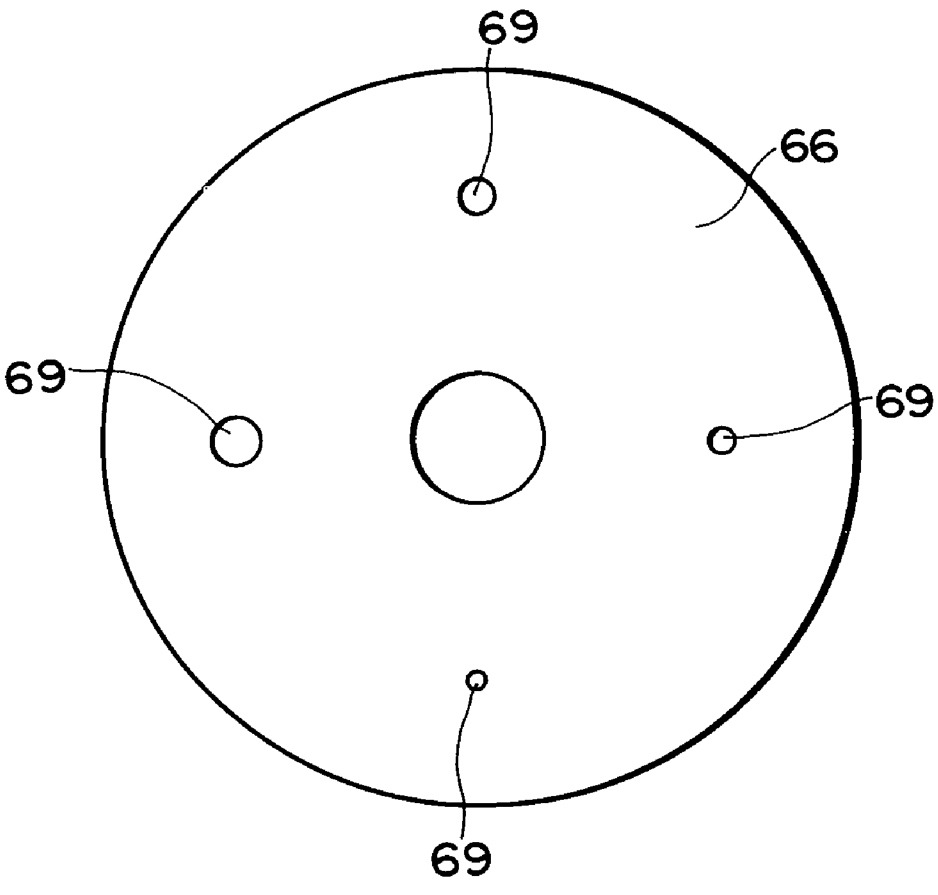
FIG. 10 is a front view of a dilution factor switching means used for the liquid dilution device of the related art.

FIG. 6 is a sectional view showing another embodiment of the liquid dilution device of the present invention. FIG. 7 is a sectional view at C—C in FIG. 6. In the second embodiment, the same numerical shows the same member as the first embodiment. As same as the first embodiment, at the time of using the liquid dilution device of the second embodiment, all the other jets 19*b*, 19*c* except the jet 19*a* through which the special liquid flows are continuously rinsed, and the choking at the jets 19*b*, 19*c* can be prevented.

As same as the first embodiment, the second embodiment comprises the diluent passage 12 in which the venturi section 14 is formed, the outer connect passage 29, and the inner connect passage 30. Further, by the seal member 28, the connection between the passage of the special liquid from the special liquid supply passage 25 of the liquid introduce device 26 to the jet 19*a* (to the first connect passage 15 of the main body 10) and the outer connect passage 29 is intercepted. Furthermore, by the first seal member 31, connection of the inner connect passage 30 with the jet 19*a* and the first connect passage 15 is intercepted. In the second embodiment, the rinse liquid supply passage 13 which is formed in the first embodiment is not adopted. It is also possible not to dispose the rinse liquid supply passage 13 at the main body 10. Further, the second seal member 36 is not disposed at the main body 10.

At some midstream of the diluent passage 12 in which the venturi section 14 is formed as the negative pressure generate section, two positions (the first position 40 and the second position 41) where relative pressure difference occurs therebetween are arranged at the upstream side of the venturi section 14 position. The first position 40 of the diluent passage 12 is the position with relatively small negative pressure (a relatively small negative pressure position). The second position 41 of the diluent passage 12 is the position with relatively large negative pressure (a relatively large negative pressure position). The first position which is the relatively small negative pressure position connects to the outer connect passage 29 through a first introduce passage 42. The second position 41 which is the relatively large negative pressure position connects to the inner connect passage 30 through a second introduce passage 43. All the other jets 19*b*, 19*c* connect to the outer connect passage 29 at one side, and connect to the inner connect passage 30 at the other side. Hence, the first position 40 of the diluent passage 12 connects to the second position 41 of the diluent passage 12 through the first introduce passage 42, the outer connect passage 29, the jets 19*b*, 19*c*, the inner connect passage 30, and the second introduce passage 43.

With the present invention having the abovementioned structure, when tap water, for example, is introduced into the diluent main passage 11, the tap water is discharged outside through the diluent passage 12. At that time, negative pressure is generated at the venturi section 14 of the diluent passage 12. The negative pressure reaches the special liquid supply passage 25 of the liquid introduce device 26. Then, the special liquid is introduced from the special liquid supply passage 25 to the diluent passage 12 through the jets 19*b*, 19*c*, and the first connect passage 15. In this manner, the special liquid is mixed with the tap water in the diluent passage 12. This is the same as the first embodiment.

When tap water flows in the diluent passage 12, pressure difference is generated between the first position 40 and the second position 41 of the diluent passage 12. The negative pressure at the second position is larger. The negative pressure at the second position 41 of the diluent passage 12 is led to the first position 40 of the diluent passage 12 through the second introduce passage 43, the inner connect passage 30, all the other jets 19*b*, 19*c*, the outer connect passage 29, and the first introduce passage 42. By the negative pressure which is led to the first position 40 of the diluent passage 12, water is introduced from the first position 40 of the diluent passage 12, and the water is conveyed to the second position 41 of the diluent passage 12 through the first introduce passage 42, the outer connect passage 29, all the other jets 19*b*, 19*c*, the inner connect passage 30, and the second introduce passage 43.

In this manner, at the state that the liquid dilution device of the present invention is used, water flows through all the other jets 19*b*, 19*c* through which the special liquid does not flow. The water passing through the jet 19 is accelerated to high velocity at the position of the jet 19 which sectional area is small. The special liquid which is stuck to the jet 19*b* can be removed with the water of high velocity. As a result, at the time of using the liquid dilution device, all the other jets 19 through which the special liquid does not flow are continuously rinsed, and the choking at all the other jets 19 can be prevented.

Here, the first embodiment and the second embodiment are explained with tap water as the liquid to which the special liquid is mixed. However, it is not limited to tap water.

In addition, in the second embodiment, the first position 40 of the diluent passage 12 to connect to the first introduce passage 42 and the second position 41 of the diluent passage 12 to connect to the second introduce passage 43 are located at the upstream of the venturi section 14 of the diluent passage 12. However, even though the first position 40 of the diluent passage 12 to connect to the first introduce passage 42 and the second position 41 of the diluent passage 12 to connect to the second introduce passage 43 are located at the downstream of the venturi section 14 of the diluent passage 12, all the other jets 19*b*, 19*c* can be rinsed.

INDUSTRIAL APPLICABILITY

As mentioned above, with the liquid dilution device of the present invention, all the other jets except the jet which measures the special liquid amount are rinsed by tap water and the like at the time of using. As a result, even though the jet which is used before has not been used for a considerable time, the jet is rinsed every time the liquid dilution device is used. Therefore, adjusting variation or choking of the jet due to sticking of the special liquid can be prevented.

The invention claimed is:

1. A liquid dilution device, comprising:

a main body;

a diluent passage formed in said main body;

a negative pressure generate section formed in some midstream of said diluent passage;

a first connect passage formed in said main body and connected to said negative pressure generate section;

a special liquid supply passage to supply special liquid to said diluent passage through said first connect passage;

a rinse liquid supply passage formed in said main body being different from said diluent passage;

a negative pressure generate section formed in some midstream of said rinse liquid supply passage;

a cylindrical dial disposed to be free to pivot outside said main body;

a plurality of jets disposed on a specific circumference of said dial to connect said first connect passage to said special liquid supply passage;

an outer body disposed outside said dial to cover said jet;

an outer connect passage formed at the facing position of said dial and said outer body, to be connected with the other jet than the jet which connects said first connect passage to said special liquid supply passage;

a rinse liquid introduce passage connected at one side to a position which negative pressure is smaller than that of said negative pressure generate section of said rinse liquid supply passage, and connected at the other side to said outer connect passage;

an inner connect passage formed at the facing position of said dial and said main body, to be connected with the other jet; and a second connect passage connected at one side to said inner connect passage, and at the other side to said negative pressure generate section of said rinse liquid supply passage;

wherein negative pressure is generated at said negative pressure generate section of said rinse liquid supply passage by flowing liquid in said rinse liquid supply passage, and the liquid is conveyed by the negative pressure from said rinse liquid supply passage to said negative pressure generate section of said rinse liquid supply passage in order via said rinse liquid introduce passage, said outer connect passage, the other jet, and said second connect passage, so that the liquid flowing in said rinse liquid supply passage flows through the other jet.

2. The liquid dilution device according to claim 1, further comprising:

a slot formed at the inner wall of said dial respectively, extending from the position near each jet to a position with some distance; and a cylindrical second seal member attached at a position surrounding said second connect passage of said main body;

wherein said second seal member contacts invariably to the inner wall of said dial around a position at which one of the other jets is held, and said second connect passage connects to said inner connect passage via said slot corresponding to the jet at the position surrounded by said second seal member, only when each jet is at a specific position.

3. The liquid dilution device according to claim 2, further comprising a cylindrical first seal member attached at a position surrounding said first connect passage of said main body; wherein said first seal member contacts invariably to the inner wall of said dial around a position at which the jet which connects said first connect passage with said special liquid supply passage is held, and the connection between said first connect passage and said inner connect passage is intercepted even through said slot.

4. A liquid dilution device, comprising:

a main body;

a diluent passage formed in said main body;

a negative pressure generate section formed in some midstream of said diluent passage;

a first connect passage formed in said main body and connected to said negative pressure generate section;

a special liquid supply passage to supply special liquid to said diluent passage through said first connect passage;

a cylindrical dial disposed to be free to pivot outside said main body;

a plurality of jets disposed on a specific circumference of said dial to connect said first connect passage to said special liquid supply passage;

an outer body disposed outside said dial to cover said jet;

an outer connect passage formed at the facing position of said dial and said outer body, to be connected with the other jet than the jet which connects said first connect passage to said special liquid supply passage;

an inner connect passage formed at the facing position of said dial and said main body, to be connected with the other jet;

a first introduce passage connecting a relatively small negative pressure position in said diluent passage to said outer connect passage; and a second introduce passage connecting a relatively large negative pressure position in said diluent passage to said inner connect passage;

wherein pressure difference is generated between said relatively large negative pressure position and said relatively small negative pressure position by flowing liquid in said diluent passage, and the liquid is conveyed by the pressure difference from said small negative pressure position of said diluent passage to said large negative pressure position of said diluent passage via said first introduce passage, said outer connect passage, the other jet, said inner connect passage, and said second introduce passage, so that the liquid flowing in said diluent passage flows through the other jet.

* * * * *